(12) United States Patent
Anderson

(10) Patent No.: US 6,523,730 B2
(45) Date of Patent: Feb. 25, 2003

(54) LOCKING DEVICE FOR LADDERS

(76) Inventor: Kent Anderson, 8175 32nd St. SE., Jamestown, ND (US) 58401

( * ) Notice: Subject to any disclaimer, the term of this patent is extended or adjusted under 35 U.S.C. 154(b) by 40 days.

(21) Appl. No.: 09/739,777

(22) Filed: Dec. 20, 2000

(65) Prior Publication Data

US 2001/0030213 A1 Oct. 18, 2001

Related U.S. Application Data

(60) Provisional application No. 60/182,915, filed on Feb. 16, 2000.

(51) Int. Cl.[7] ................................................. B60R 9/00
(52) U.S. Cl. ....................... 224/324; 182/127; 224/310; 224/315; 224/319; 224/403; 224/560; 224/561
(58) Field of Search ................................ 224/324, 319, 224/315, 309, 310, 403, 42.38, 560, 561, 924; 248/503; 182/127; 410/143, 151

(56) References Cited

U.S. PATENT DOCUMENTS

| 2,134,823 | A |   | 11/1938 | Herrmann et al. |
| 3,614,064 | A | * | 10/1971 | Bennett ....................... 224/324 |
| 4,174,119 | A | * | 11/1979 | Biles ........................... 224/324 |
| 4,813,585 | A | * | 3/1989 | Nutt ............................ 182/127 |
| 4,827,742 | A |   | 5/1989 | McDonald |
| 5,009,350 | A | * | 4/1991 | Schill et al. ................. 182/127 |
| 5,154,258 | A |   | 10/1992 | Krukow |
| 5,186,588 | A |   | 2/1993 | Sutton et al. |
| 5,833,414 | A | * | 11/1998 | Feldman et al. ............ 224/324 |
| 5,918,488 | A |   | 7/1999 | Deeter |
| 6,135,686 | A | * | 10/2000 | Chasen ....................... 182/127 |

* cited by examiner

Primary Examiner—Stephen P. Garbe
Assistant Examiner—Maerena W. Brevard
(74) Attorney, Agent, or Firm—Richard C. Litman

(57) ABSTRACT

A locking assembly for securing a ladder to the roofrack of a vehicle. The locking assembly comprises a mounting bracket, a movable shaft slidably disposed in a channel defined in the mounting bracket, and a locking mechanism. The locking mechanism includes a handle, a sheave attached to an end of the handle, and a bias spring connected between the mounting bracket and the handle, the spring biasing the handle so that the sheave extends through an elongated opening in the channel to engage the moveable shaft in order to prevent further sliding movement through the channel. The locking assembly can be adjusted to accommodate any size of ladder.

8 Claims, 4 Drawing Sheets

LOCKING DEVICE FOR LADDERS

CROSS-REFERENCE TO RELATED APPLICATION

This application claims the benefit of U.S. Provisional Patent Application Serial No. 60/182,915, filed Feb. 16, 2000.

BACKGROUND OF THE INVENTION

1. Field of the Invention

The present invention relates generally to locking devices and more particularly, to a locking assembly for securing ladders to a roofrack. The locking device of the present invention employs a novel locking mechanism to ensure that a ladder is properly secured to the roofrack of a vehicle.

2. Description of Related Art

Roofracks of vehicles are frequently used to transport items such as ladders from one location to another. The potential for property damage and bodily injury would be very high if the transported ladder were to become detached and fall from the roofrack. Therefore, to ensure the safety of other motorists and of the vehicle. Furthermore, the secure attachment of a ladder to a roofrack prevents unauthorized removal of the ladder. Any locking device used to secure a ladder to the roofrack should be easy to install and straightforward to operate.

The prior art describes an assortment of locking devices used to secure a ladder to the roofrack of a vehicle. For example, U.S. Pat. No. 2,134,823, issued on Nov. 1, 1938 to C. S. Herrmann et al. discloses a device for holding ladders in position on the sides of trucks. The device includes a hook member which clamps the ladder to a support and a lever for releasing the hook member.

A security assembly for a vehicle roofrack is described in U.S. Pat. No. 4,827,742, issued on May 9, 1989 to R. R. McDonald. The security assembly includes a lock which moves a hooked rod from a locking position with respect to a rung of the ladder to a release position spaced from the rung, and vice versa.

U.S. Pat. No. 5,154,258, issued on Oct. 13, 1992 to C. D. Krukow shows a spring loaded pivoting arm for securing a ladder to a rack.

U.S. Pat. No. 5,186,588, issued on Feb. 16, 1993 to C. W. Sutton et al., describes a ladder rack latch. The latch is formed by a latch body rigidly secured in depending relation to the cross brace of a vehicle roofrack. An elongated ladder rung hook is supported by the latch body and a handle operated lever within the latch body moves the hook into and out of contact with the ladder rungs.

A ladder lock is described in U.S. Pat. No. 5,918,488, issued on Jul. 6, 1999 to D. L. Deeter. The ladder lock has a threaded screw member at one end and a curved opposite end. The screw member is hooked under the ladder rack or roofrack and interlocked with a crossbar and handle to secure the ladder.

None of the above inventions and patents, taken either singly or in combination, is seen to disclose the instant invention as will be subsequently described and claimed.

SUMMARY OF THE INVENTION

The present invention provides a locking assembly that secures a ladder to the roofrack of a vehicle. The locking assembly comprises a movable hooked shaft, a mounting bracket, and a locking mechanism. The movable hooked shaft allows the locking assembly to be adjusted to accommodate different ladder sizes. The locking assembly of the present invention can also be used to secure either pipes or a snowmobile to a snowmobile trailer.

The locking mechanism employs a spring, a handle, and a sheave. The movable shaft has grooves equally spaced along its posterior length and the sheave has protrusions equally spaced along its circumference. The spring loaded locking mechanism holds the movable shaft in place by interlocking a groove of the movable shaft with a protrusion of the sheave.

Accordingly, it is a principal object of the invention to provide a locking assembly for securing a ladder to a roofrack of a vehicle.

It is another object of the invention to provide a locking assembly that is strong and durable.

It is a further object of the invention to provide a locking assembly that prevents unauthorized removal of a ladder from a vehicle roofrack.

Still another object of the invention is to provide a locking assembly that is straightforward to operate.

It is an object of the invention to provide improved elements and arrangements thereof in a locking assembly for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
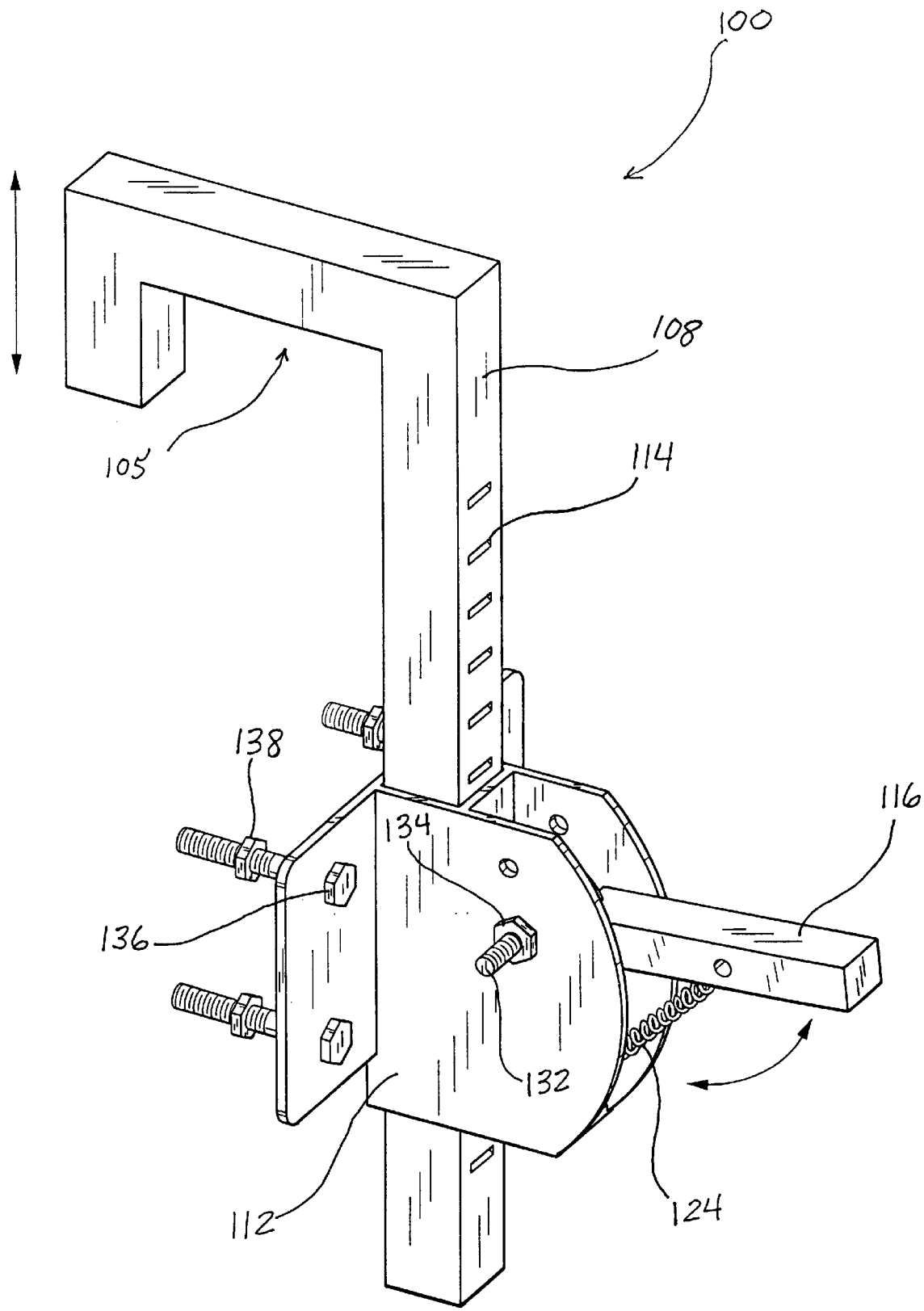
FIG. 1 is a perspective view of a locking assembly in an opened position according to the present invention.
Figure 2:
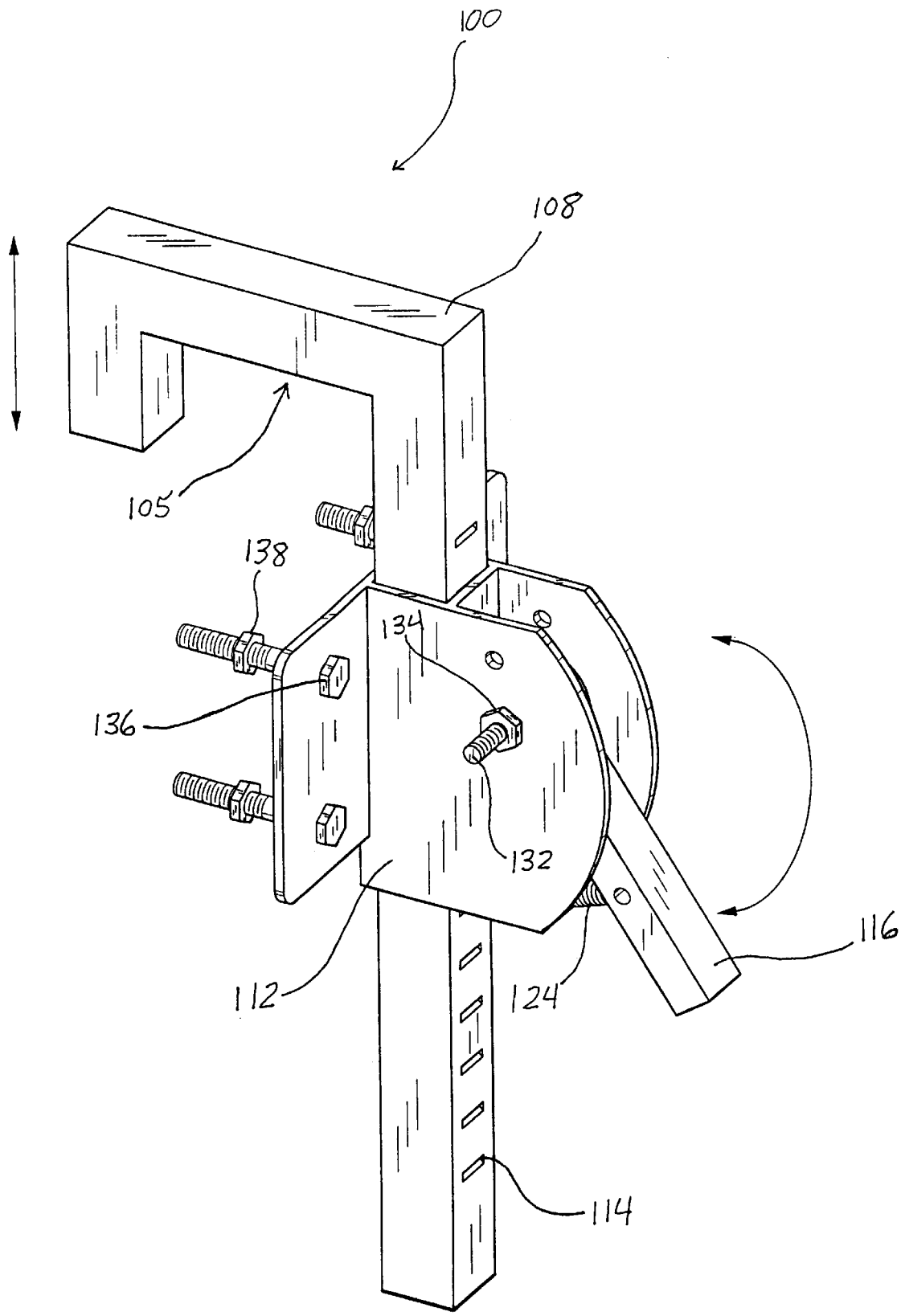
FIG. 2 is a perspective view of the locking assembly in a closed position.
Figure 3:
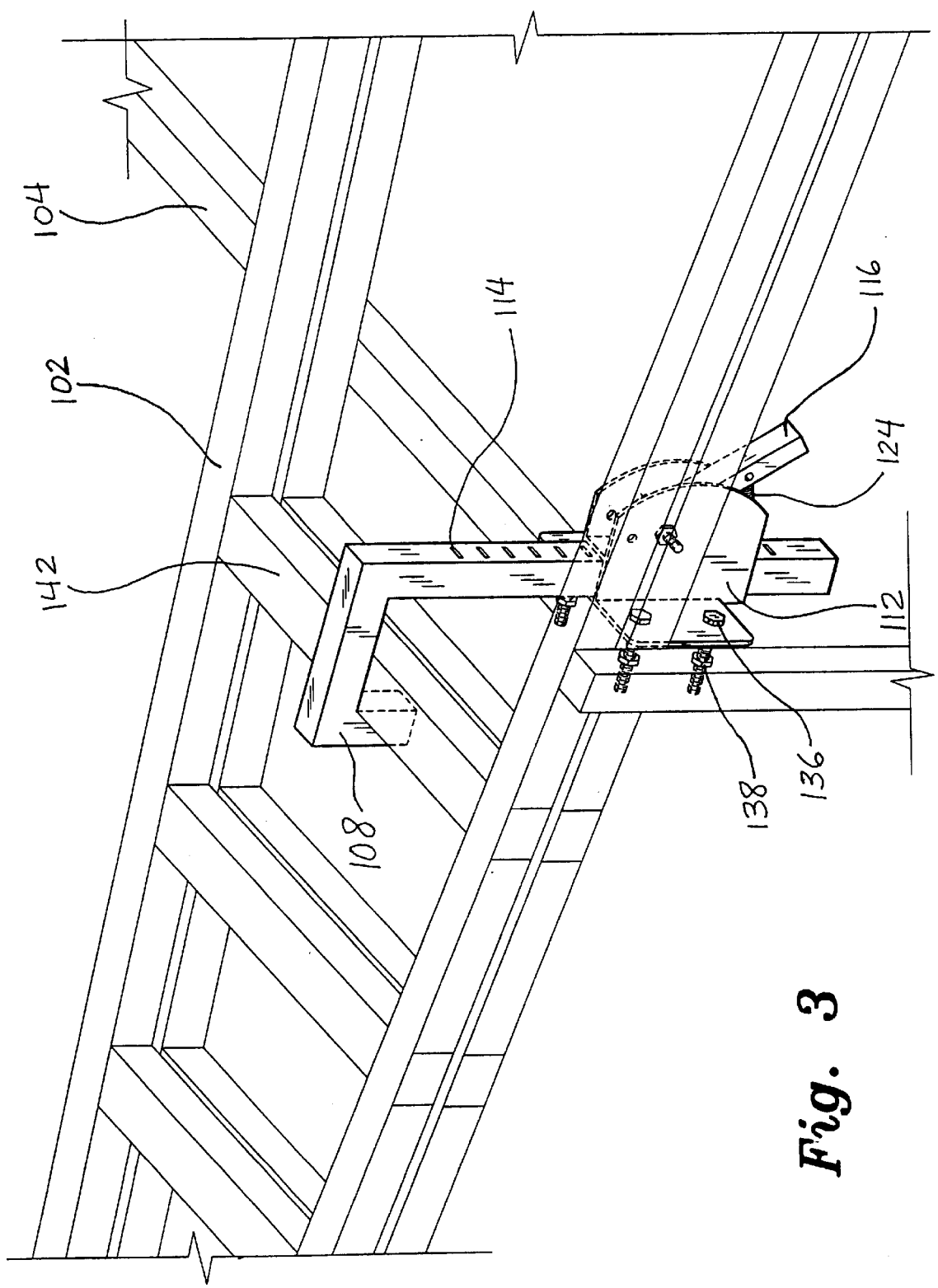
FIG. 3 is an environmental, perspective view of the locking assembly securing a ladder to a roofrack.
Figure 4:
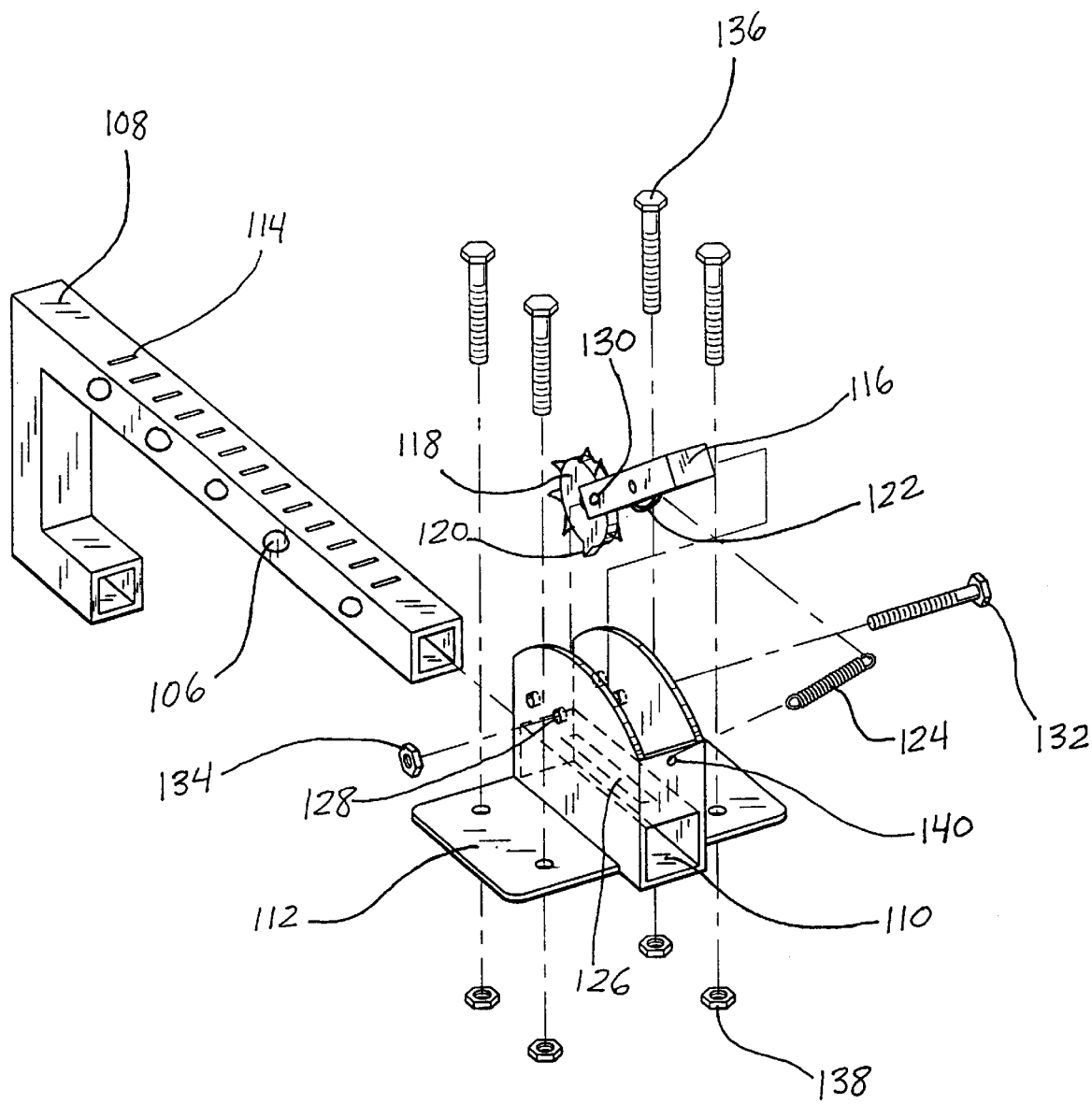
FIG. 4 is an exploded view of the locking assembly showing the component parts.

The present invention, as depicted in FIGS. 1–4, is a locking assembly 100 used to secure a ladder 102 to the roofrack 104 of a vehicle (not shown). FIG. 1 is a perspective view of the locking assembly 100 of the present invention in an opened position according to the present invention. The locking assembly 100 employs a movable shaft 108 that has small notches or grooves 114 equidistantly disposed along the length of its posterior surface. One end 105 of the movable shaft 108 is hooked or approximately U-shaped. The movable shaft 108 of the locking assembly 100 is shown at near its maximum height in FIG. 1, that is, the locking assembly 100 is shown in a nearly fully extended position. The movable shaft 108 is disposed within a channel 110 (see FIG. 4) along the midline of a mounting bracket 112, which bracket is directly bolted to the roofrack 104 (see FIG. 3). The movable shaft 108 is either pushed or pulled to the desired location and locked into place by a locking mechanism comprising a spring 124, a handle 116 and a sheave 118 (FIG. 4). Sheave 118 is provided with protrusions or teeth 120 equally spaced therearound. The spring 124 is attached at one end to an opening 140 in the mounting bracket 112. At its other end, spring 124 is attached near the midpoint of the handle 116. The spring 124 attaches to a small loop 122 in the handle 116. The sheave 118 and the handle 116 are made of a unitary or one piece construction as shown in FIG. 4.

FIG. 2 is a perspective view of the locking assembly 100 in a closed position. The handle locking mechanism is disengaged by pulling the handle 116 upwards into the position depicted in FIG. 1 and the handle locking mechanism is engaged when in the position depicted in FIG. 2. A protrusion 120 of the sheave 118 fits into a notch or groove 114 of the shaft 108 and the sheave 118 is held in place by the tension of the spring 124. By pushing upwards on the handle 116 when the handle 116 is in the engaged position, the protrusion 120 of the sheave 118 dislodges from the groove 114 of the shaft 108 and the sheave 118 lifts outwardly away from the shaft 108. The movable shaft 108 is then adjusted upwards or downwards depending upon the height of the steps or rungs 142 of the ladder 102. FIG. 3 is an environmental, perspective view of the locking assembly 100 securing a ladder 102 to a roofrack 104. The ladder 102 is secured the roofrack 104 by the hook or U-shaped portion 105 of the movable shaft 108 engaging the rung 142 of the ladder 102. FIG. 3 shows the manner in which the mounting bracket 112 is attached to the roofrack 104. The mounting bracket 112 is bolted to a roofrack 104 using two or more bolts 136 with nuts 138 as shown in FIG. 3.

FIG. 4 is an exploded view of the locking assembly 100 showing the component parts. In an alternate embodiment, the movable shaft 108 has bilaterally disposed openings 106 along its sides (only one side shown). These openings 106 are for use with a padlock (not shown) to prevent unauthorized removal of a ladder 102. A transversely disposed pin or bolt 132 is used to secure the sheave 118 and handle 116 to the mounting bracket 112. The transversely disposed pin 132 is inserted into an opening 128 in the mounting bracket 112 and an opening 130 in the handle 116. The transversely disposed pin 132 is the pivoting point about which the one piece sheave 118 and handle 116 pivot when the handle 116 is lifted or lowered to lock or unlock the locking assembly 100. The sheave 120 fits through an elongated opening 126 in the channel 110 and engages the movable shaft 108 disposed within the mounting bracket channel 110. The locking assembly of the present invention can accommodate a broad spectrum of items, for example, the locking assembly can be used to secure pipes to the roofrack of a vehicle or to secure a snowmobile to a snowmobile trailer. When the locking assembly is used to secure pipes to a roofrack, an adjustable strap is employed. The adjustable strap is located at the upper end of the movable shaft and is tightened around the pipes by means of a handle located at the lower end of the movable shaft. When the locking assembly is used to secure a snowmobile to a trailer, an elongated bar is employed. The elongated bar is disposed at the upper end of the movable shaft and is used to hold the snowmobile securely in place.

The preferred embodiments of the present invention disclosed herein are intended to be illustrative only and are not intended to limit the scope of the invention. It should be understood by those skilled in the art that various modifications and adaptations as well as alternative embodiments of the present invention may be contemplated.

It is to be understood that the present invention is not limited to the sole embodiments described above, but encompasses any and all embodiments within the scope of the following claims.

I claim:

1. A locking assembly for securing an item to a roofrack of a vehicle, comprising:
   a mounting bracket;
   a plurality of walls defining a channel, said channel disposed in said mounting bracket and extending therethrough;
   an elongated opening, said elongated opening disposed in one of said plurality of walls of said channel;
   a shaft, said shaft having a first end, a second end, a pair of side walls, and a posterior wall, said first end of said shaft positioned within said channel for slidable movement therein, said second end of said shaft being configured in a U-shape and adapted to engage the item to be secured to the roofrack; and
   a plurality of grooves equidistantly disposed along the posterior wall of said shaft for latching said shaft in said channel to prevent said shaft from slidable movement therein;
   a sheave member having a circumference, said sheave member mounted for pivotal movement to said mounting bracket;
   a plurality of protruding teeth disposed on said circumference of said sheave member and evenly spaced there around;
   a handle member mounted to said sheave member;
   a spring, said spring having a first end and a second end, wherein said first end is attached to said mounting bracket and said second end is attached to said handle.

2. The locking assembly according to claim 1, including a plurality of openings disposed in said pair of side walls of said shaft at said first end of said shaft.

3. The locking assembly according to claim 2, wherein said plurality of openings are evenly spaced along said side walls.

4. The locking assembly according to claim 3, including second means adapted to attach said mounting bracket to the roofrack.

5. A locking assembly for securing an item to a roofrack of a vehicle, comprising:
   a mounting bracket;
   a plurality of walls defining a channel, said channel disposed in said mounting bracket and extending therethrough;
   an elongated opening, said elongated opening disposed in one of said plurality of walls of said channel;
   a shaft, said shaft having a first end, a second end, a pair of side walls, and a posterior wall, said first end of said shaft positioned within said channel for slidable movement therein with said posterior wall being disposed adjacent said elongated opening, said second end of said shaft being configured in a U-shape and adapted to engage the item to be secured to the roofrack;
   a plurality of grooves equidistantly disposed along said posterior wall of said shaft;
   a sheave member mounted for pivotal movement to said mounting bracket for latching said shaft in said channel via said elongated opening to prevent said shaft from slidable movement therein, said sheave member having a circumference;
   a plurality of protruding teeth disposed on said circumference of said sheave member and evenly spaced there around;
   a handle member mounted to said sheave member; and
   a spring, said spring having a first end and a second end, wherein said first end is attached to said mounting bracket and said second end is attached to said handle.

6. The locking assembly according to claim 5, including a plurality of openings disposed in said pair of side walls of said shaft at said first end of said shaft.

7. The locking assembly according to claim 6, wherein said plurality of openings are evenly spaced along said pair of side walls.

8. A locking assembly according to claim 7, including second means adapted to attach said mounting bracket to the roofrack.

* * * * *